US009904806B2

United States Patent
Ju

(10) Patent No.: US 9,904,806 B2
(45) Date of Patent: Feb. 27, 2018

(54) HARDWARE SECURITY MODULE, METHOD OF UPDATING INTEGRITY CHECK VALUE STORED IN HARDWARE SECURITY MODULE, AND METHOD OF UPDATING PROGRAM STORED IN TERMINAL BY USING HARDWARE SECURITY MODULE

(71) Applicant: ELECTRONICS AND TELECOMMUNICATIONS RESEARCH INSTITUTE, Daejeon (KR)

(72) Inventor: Hong Il Ju, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 186 days.

(21) Appl. No.: 15/018,778

(22) Filed: Feb. 8, 2016

(65) Prior Publication Data
US 2016/0232381 A1 Aug. 11, 2016

(30) Foreign Application Priority Data
Feb. 11, 2015 (KR) .......................... 10-2015-0020746

(51) Int. Cl.
G06F 8/65 (2018.01)
G06F 21/00 (2013.01)
(Continued)

(52) U.S. Cl.
CPC .............. *G06F 21/72* (2013.01); *G06F 21/64* (2013.01); *H04L 63/0823* (2013.01);
(Continued)

(58) Field of Classification Search
CPC . G06F 8/65; G06F 21/00; G06F 21/10; G06F 21/44; G06F 21/51; G06F 21/56; G06F 21/60; G06F 21/64; H04L 67/34
See application file for complete search history.

(56) References Cited

U.S. PATENT DOCUMENTS 8,413,209 B2 4/2013 Aldera et al.
9,264,419 B1 * 2/2016 Johansson ............... H04L 63/08
(Continued)

FOREIGN PATENT DOCUMENTS

KR 10-1428769 B1 8/2014

*Primary Examiner* — Joseph P Hirl
*Assistant Examiner* — Kalish Bell

(57) ABSTRACT

Provided is a method of updating an integrity check value (ICV) stored in a hardware security module (HSM). The method includes storing user authentication information of the terminal transferred from the terminal to preregister a user of the terminal, transferring an authentication information request message, requesting the user authentication information, to the terminal in response to an update request message which is transferred from the terminal and includes an update value of the ICV, comparing the user authentication information transferred from the terminal with the stored user authentication information to perform an authentication operation on the user of the terminal according to the authentication information request message; and when the user of the terminal is successfully authenticated, updating the stored ICV by using the update value.

17 Claims, 4 Drawing Sheets

(51) Int. Cl.
  *G06F 21/10* (2013.01)
  *G06F 21/44* (2013.01)
  *G06F 21/51* (2013.01)
  *G06F 21/56* (2013.01)
  *G06F 21/60* (2013.01)
  *G06F 21/64* (2013.01)
  *G06F 21/72* (2013.01)
  *H04L 29/06* (2006.01)
  *H04W 12/06* (2009.01)

(52) U.S. Cl.
  CPC ......... *H04L 63/0853* (2013.01); *H04W 12/06* (2013.01); *H04L 63/12* (2013.01)

(56) References Cited

U.S. PATENT DOCUMENTS

| | | |
|---|---|---|
| 2007/0028120 A1 | 2/2007 | Wysocki et al. |
| 2012/0166801 A1 | 6/2012 | Park et al. |
| 2014/0033318 A1 | 1/2014 | Han et al. |
| 2015/0172255 A1* | 6/2015 | Warnez ................. H04W 4/001 713/168 |
| 2015/0263898 A1 | 9/2015 | Shin et al. |
| 2016/0048694 A1* | 2/2016 | Martinez ............... G06F 21/606 713/193 |

* cited by examiner

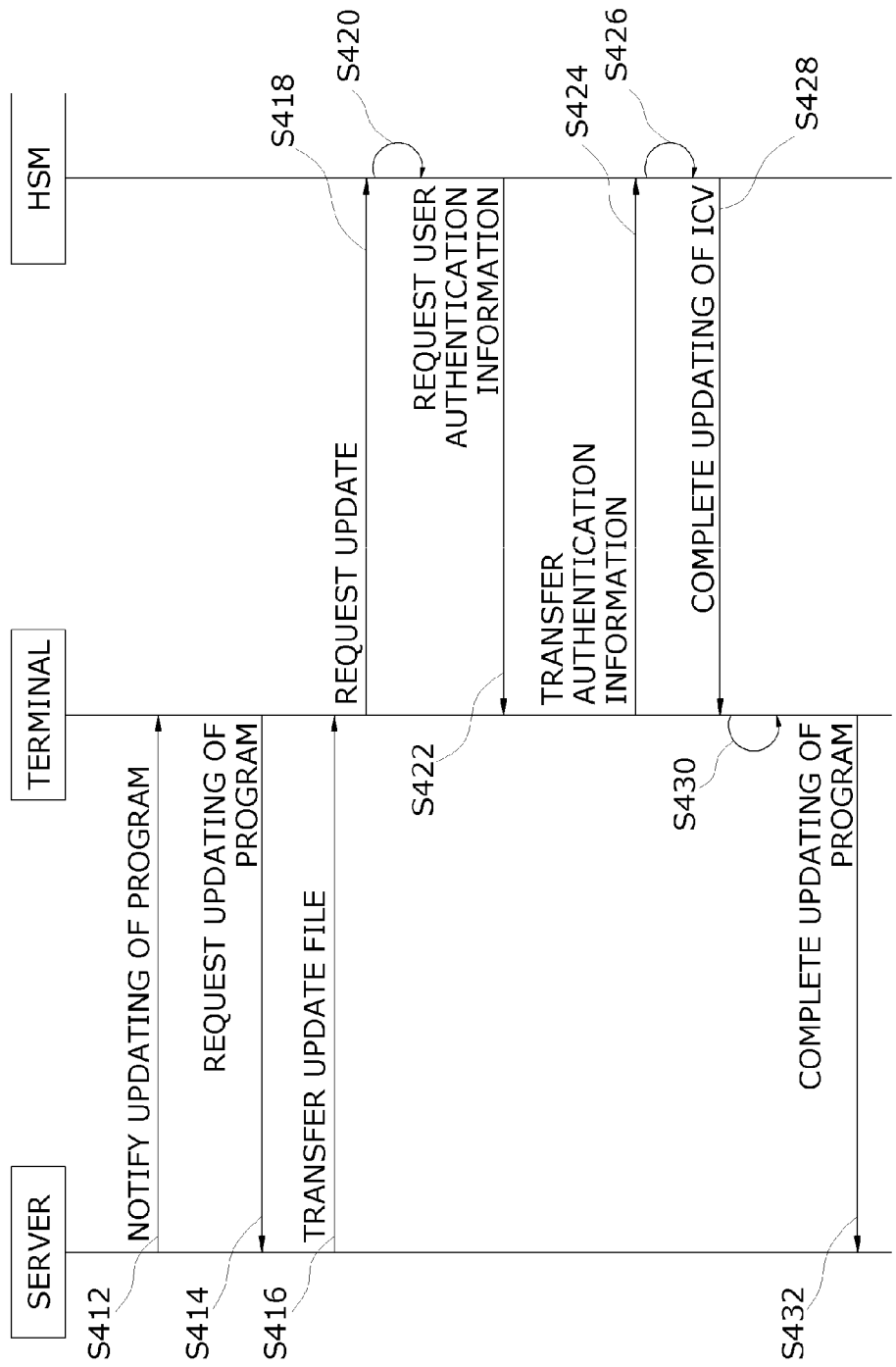

HARDWARE SECURITY MODULE, METHOD OF UPDATING INTEGRITY CHECK VALUE STORED IN HARDWARE SECURITY MODULE, AND METHOD OF UPDATING PROGRAM STORED IN TERMINAL BY USING HARDWARE SECURITY MODULE

CROSS-REFERENCE TO RELATED APPLICATIONS

This application claims priority under 35 U.S.C. § 119 to Korean Patent Application No. 10-2015-0020746, filed on Feb. 11, 2015, the disclosure of which is incorporated herein by reference in its entirety.

TECHNICAL FIELD

The present invention relates to a method of stably updating significant data stored in a hardware security module or programs installed in a mobile terminal.

BACKGROUND

Recently, a hardware-based mobile security solution is being actively researched for overcoming a limitation of a software-based mobile security solution of the related art.

As an example of researching the hardware-based mobile security solution, a hardware security module (HSM) built into mobile terminals is being researched and developed.

As a representative example of the HSM built into mobile terminals, there are mobile trusted modules (MTMs). The MTMs perform a security operation of authenticating a device, ensuring integrity of a device, and protecting significant data.

The HSM built into mobile terminals may be a type of embedded system that performs a security operation by using hardware resources such as a hardware cryptographic coprocessor-based encryption engine, a memory, and/or the like.

The HSM stores an integrity check value (ICV) for checking integrity of each of bootloader, kernel, and operating system (OS) images for providing reliable booting of mobile terminals and integrity of when an application is installed and executed. The ICV should be stably stored and should not be arbitrarily changed.

Particularly, when it is required to update significant data such as the ICV stored in the HSM, an updating operation should be stably ensured. However, a method of stably updating the significant data is not proposed to date.

Unless a method of stably updating the significant data stored in the HSM is proposed, integrity of each of firmware, programs, data, and/or the like installed and stored in mobile terminals cannot be ensured.

SUMMARY

Accordingly, the present invention provides a method and a system, which stably update an ICV stored in an HSM and significant software installed in a mobile terminal.

In one general aspect, a method of updating an integrity check value (ICV), stored in a hardware security module (HSM) which is built into a terminal, includes a dedicated hardware resource independent from a hardware resource included in the terminal, and performs a security operation associated with checking of integrity of significant data installed in the terminal based on the dedicated hardware resource, includes: storing user authentication information of the terminal transferred from the terminal to preregister a user of the terminal; transferring an authentication information request message, requesting the user authentication information, to the terminal in response to an update request message which is transferred from the terminal and includes an update value of the ICV; comparing the user authentication information transferred from the terminal with the stored user authentication information to perform an authentication operation on the user of the terminal according to the authentication information request message; and when the user of the terminal is successfully authenticated, updating the stored ICV by using the update value.

In another general aspect, a method of updating a program, stored in a terminal by using a hardware security module (HSM) which is built into the terminal, includes a dedicated hardware resource independent from a hardware resource included in the terminal, and performs a security operation associated with checking of integrity of significant data installed in the terminal based on the dedicated hardware resource, includes: receiving, by the terminal, an update file for updating the program, an update value for updating an integrity check value (ICV) of the program, and a signature value of the server from the server, and transferring an update request message including the received update value and signature value to the HSM; transferring, by the HSM, an authentication information request message requesting user authentication information of the terminal to the terminal in response to the update request message; transferring, by the terminal, the user authentication information of the terminal to the HSM in response to the authentication information request message; comparing, by the HSM, the user authentication information with preregistered user authentication information to perform an authentication operation on the user of the terminal, and when the user of the terminal is successfully authenticated, updating a pre-stored ICV by using the update value; when updating of the ICV is completed, by the HSM, transferring an update completion message to the terminal; and updating, by the terminal, the program by using the update file in response to the update completion message.

In another general aspect, a hardware security module (HSM), which is built into a terminal, includes a dedicated hardware resource independent from a hardware resource included in the terminal, and performs a security operation associated with checking of integrity of significant data installed in the terminal based on the dedicated hardware resource, includes: a key generator configured to generate a key pair including a public key and a private key of the terminal; a storage unit configured to store user authentication information of the terminal and an integrity check value (ICV) for checking the integrity of the significant data installed in the terminal; and a second processor configured to receive an update value of the ICV, encrypted based on the public key of the terminal, from a first processor included in the terminal and update the ICV stored in the storage unit by using the received update value, the second processor being driven independent from the a first processor, wherein the second processor receives the user authentication information of the terminal encrypted based on the public key of the terminal from the first processor, decrypts the received user authentication information of the terminal by using the private key of the terminal, and compares the decrypted user authentication information of the terminal with the user authentication information of the terminal stored in the storage unit, and when authentication of the user is completed, the second processor decrypts the encrypted update value of the ICV by using the private key of the terminal and updates the ICV stored in the storage unit by using the decrypted update value.

Other features and aspects will be apparent from the following detailed description, the drawings, and the claims.

BRIEF DESCRIPTION OF THE DRAWINGS

FIG. 4 is a flowchart illustrating an operation of updating an ICV stored in an HSM and programs installed in a mobile terminal, according to an embodiment of the present invention.

DETAILED DESCRIPTION OF EMBODIMENTS

In order to solve problems of the related art, the present invention provides a method that corrects or updates significant data stored in a mobile terminal and an HSM built into the mobile terminal after a user is authenticated and an access authority on the mobile terminal is checked.

The advantages, features and aspects of the present invention will become apparent from the following description of the embodiments with reference to the accompanying drawings, which is set forth hereinafter.

However, the present invention may be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
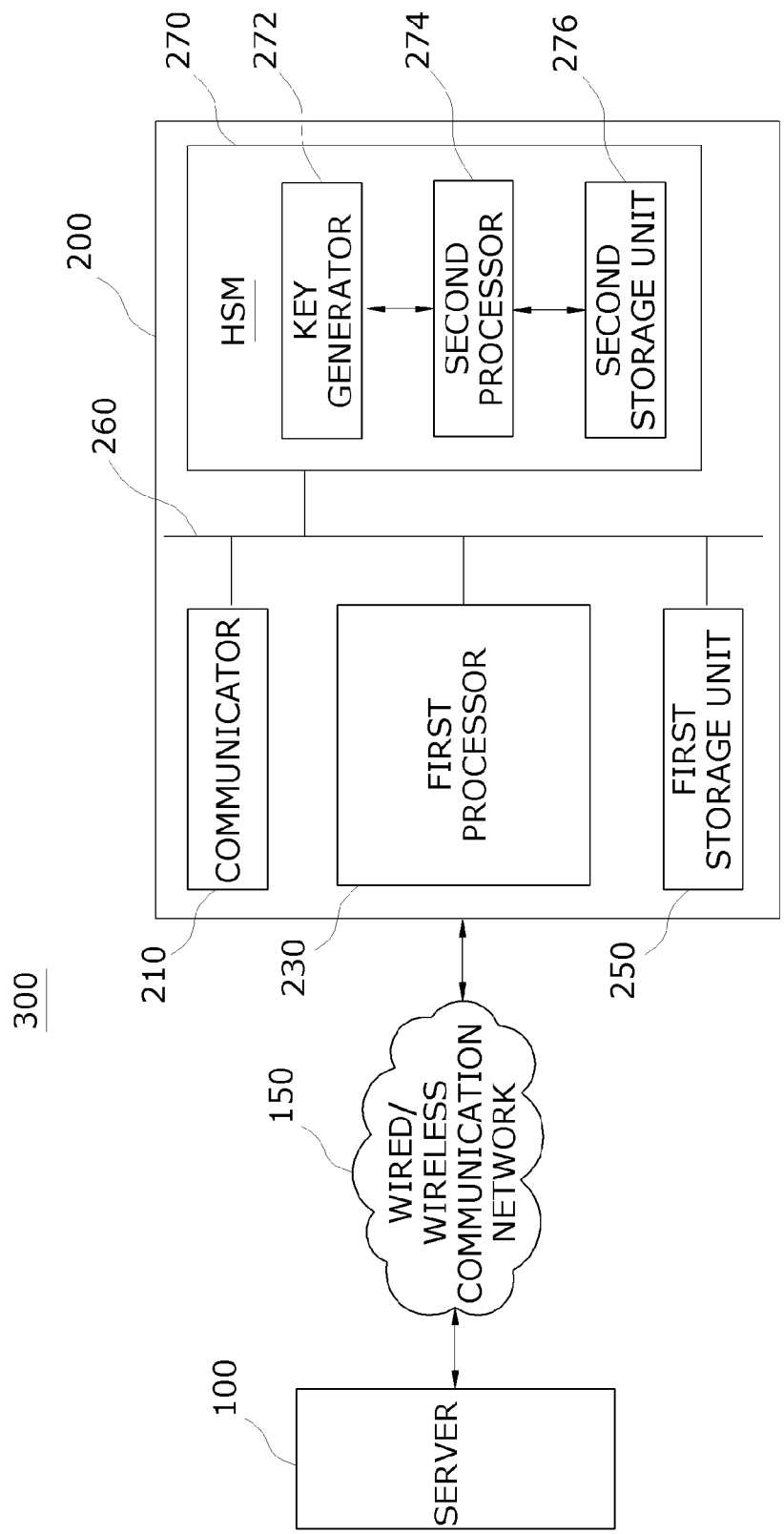
FIG. 1 is a diagram illustrating a whole configuration of a computing system according to an embodiment of the present invention.

FIG. 1 is a diagram illustrating a whole system 300 according to an embodiment of the present invention.

Referring to FIG. 1, the whole system 300 according to an embodiment of the present invention may stably update an ICV stored in an HSM and may stably update software installed and stored in a mobile terminal, based on the stably updated ICV.

To this end, the whole system 300 according to an embodiment of the present invention may include a server 100 and a mobile terminal 200 which are connected to each other through a wired/wireless communication network 150. An HSM 270 may be built into the mobile terminal 200.

In the present embodiment, the HSM 270 is exemplified as being built into the mobile terminal 200, but is not limited thereto. In another embodiment, an HSM may be physically separated from a mobile terminal and may perform a security operation of the mobile terminal. In this case, the mobile terminal 200 may be connected to the HSM 270 through a micro-secure digital (SD) interface, a universal subscriber identity module (USIM) interface, or the like.

The server 100 may determine whether to update various programs installed in the mobile terminal 200, and when an update is needed, the server 100 may inform, through the wired/wireless communication network 150, the mobile terminal 200 that there is an update file for updating a corresponding program.

When the server 100 receives a request for updating of a corresponding program from the mobile terminal 200, the server 100 may transfer, to the mobile terminal 200, an update file for updating the program, an ICV for checking integrity of the update file, and a signature value of the server 100 through the wired/wireless communication network 150. In this case, for security, the ICV and the signature value may be encrypted and generated according to a symmetric key encryption algorithm and may be transferred to the mobile terminal 200.

For example, the server 100 may generate a key pair including a public key and a private key of the server 100 according to the asymmetric key encryption algorithm and may store the key pair, and may store a public key of a unique asymmetric key pair of the mobile terminal 200. The server 100 may encrypt the ICV by using the public key of the mobile terminal 200 and may transfer the encrypted ICV to the mobile terminal 200.

Moreover, the server 200 may generate a signature value by using the private key of the server 200 and may transfer the signature value to the mobile terminal 200 along with the encrypted ICV.

In terms of an important feature of the present invention, the mobile terminal 200 may receive the ICV which is encrypted by using the public key of the mobile terminal 200 and the signature value which is generated by using the private key of the server 100, but for security, the mobile terminal 200 may decrypt the ICV and the signature value but may not store the decrypted ICV and signature value.

That is, the mobile terminal 200 may merely function as a transfer medium that transfers, to the HSM 270 built into the mobile terminal 200, the ICV which is encrypted by using the public key of the mobile terminal 200 and the signature value which is generated by using the private key of the server 100.

Therefore, the ICV which is encrypted by using the public key of the mobile terminal 200 and the signature value which is generated by using the private key of the server 100 may be decrypted by the HSM 270 and may be stored in a storage unit included in the HSM 270.

The server 100 may be a server that is operated by a manufacturer of various programs installed in the mobile terminal 200, or may be a server which is operated by a manufacturer of the mobile terminal 200. Also, the server 100 may be a server operated by a communication company that operates and manages the wired/wireless communication network 150.

The mobile terminal 200 may include a communicator 210, a first processor 230, a first storage unit 250, a data bus 260, and the HSM 270. The elements may be connected to each other through the data bus 260.

The communicator 210 may be configured in hardware to support mobile communication standards such as wideband code division multiple access (WCDMA), the third generation (3G), 3G long term evolution (LTE), the fourth generation (4G), etc. The communicator 210 may access the wired/wireless communication network 150 according to the mobile communication standards and may communicate with the server 100 accessing the wired/wireless communication network 150.

The first processor 230 may be a semiconductor device or a central processing unit (CPU) that executes a processing command, a mobile program, and a mobile application which are stored in the first storage unit 250, an update file for various programs transferred from the server 100, an administration application for managing a setting of the mobile terminal 200, and/or the like.

The first processor 230 may transfer information, messages, and data, which are transferred from the server 100, to the HSM 270 through the data bus 260. On the other hand, the first processor 230 may control a peripheral unit including the communicator 210 and the like to transfer information, messages, and data, which are transferred from the HSM 270, to the server 100 through the wired/wireless communication network 150.

The first storage unit 250 may include a volatile storage medium or a nonvolatile storage medium, and for example, may include a read-only memory (ROM), a flash ROM, and a random access memory (RAM).

The HSM 270 may process the information, the messages, and the data, which are transferred from the server 100, according to control by the first processor 230. For example, when the HSM 270 receives, from the server 100, information, a message, and data which are encrypted according to an asymmetric algorithm, the HSM 270 may decrypt the received information, message, and data and may internally and stably store the decrypted information, message, and data. Also, the HSM 270 may generate various request messages by using hardware resources included in the HSM 270 and may transfer the generated request messages to the first processor 230 of the mobile terminal 200, or may transfer the generated request messages to the server 100 according to control by the first processor 230.

In detail, the HSM 270 may include a key generator 272, a second processor 274, and a second storage unit 276.

The key generator 272 may generate a key pair which includes a public key and a private key of the mobile terminal 200. The key pair may be generated in a process of manufacturing the mobile terminal 200 and may be stored in the second storage unit 276. In terms of an important feature of present invention, the key pair including the unique public key and private key of the mobile terminal 200 may be generated by the key generator 272 of the HSM 270 instead of security software included in the mobile terminal 200.

Moreover, the public key of the key pair generated by the key generator 272 may be stored in the server 100. For example, as described below, in a process where a user or a seller of the mobile terminal 200 registers the mobile terminal 200 in the server 100, the public key of the mobile terminal 200 may be transferred to the server 100 through the wired/wireless communication network 150 and may be stored in the server 100.

The second processor 274 may process various information, messages, and data, which are transferred from the server 100, according to control by the first processor 230. For example, the second processor 274 may perform a decryption operation of decrypting an encrypted ICV transferred from the server 100. Also, the second processor 274 may perform a check operation of checking a signature value transferred from the server 100 by using the public key of the server 100.

In addition to the public key of the server 100, the public key and private key of the mobile terminal 100 generated by the key generator 272 may be stored in the second storage unit 276.

To help understand a description, in an embodiment of the present invention, it is assumed that the server 100 performs an encryption operation and a signature generation operation by using an initially generated key pair including the public key and private key of the server 100, and the HSM 270 of the mobile terminal 200 performs a decryption operation and a check operation by using an initially generated key pair including the public key and private key of the mobile terminal 200.

In another embodiment, the server 100 may newly generate a key pair based on the unique key of the server 100 whenever the server 100 performs the encryption operation and the signature generation operation, and the HSM 270 of the mobile terminal 200 may newly generate a key pair based on the unique key of the mobile terminal 200 whenever the HSM 270 performs the decryption operation and the check operation. The public key of the newly generated key pair of the server 100 may be transferred to the mobile terminal 200, and the public key of the newly generated key pair of the mobile terminal 200 may be transferred to the server 100. Accordingly, various operations are more stably performed.

Hereinafter, a method where the ICV stored in the HSM 270 is updated by using the elements illustrated in FIG. 1 and programs stored in the mobile terminal 200 are updated based on the updated ICV will be described in detail with reference to FIGS. 2 to 4.

An updating method according to an embodiment of the present invention may include a previous registration operation, an operation of updating the ICV stored in the HSM 270, and an operation of updating programs installed in the mobile terminal 200, based on the updated ICV.

The previous registration operation may include an operation of registering a user of the mobile terminal 200 in the HSM 270 and an operation of registering the mobile terminal 200 and the user of the mobile terminal 200 in the server 100.

The operation of registering the user of the mobile terminal 200 in the HSM 270 will be described with reference to FIG. 2, and the operation of registering the mobile terminal 200 and the user of the mobile terminal 200 in the server 100 will be described with reference to FIG. 3.

When the previous registration operation is completed, the operation of updating the ICV stored in the HSM 270 and the operation of updating the programs installed in the mobile terminal 200 based on the updated ICV will be described with reference to FIG. 4.

Figure 2:
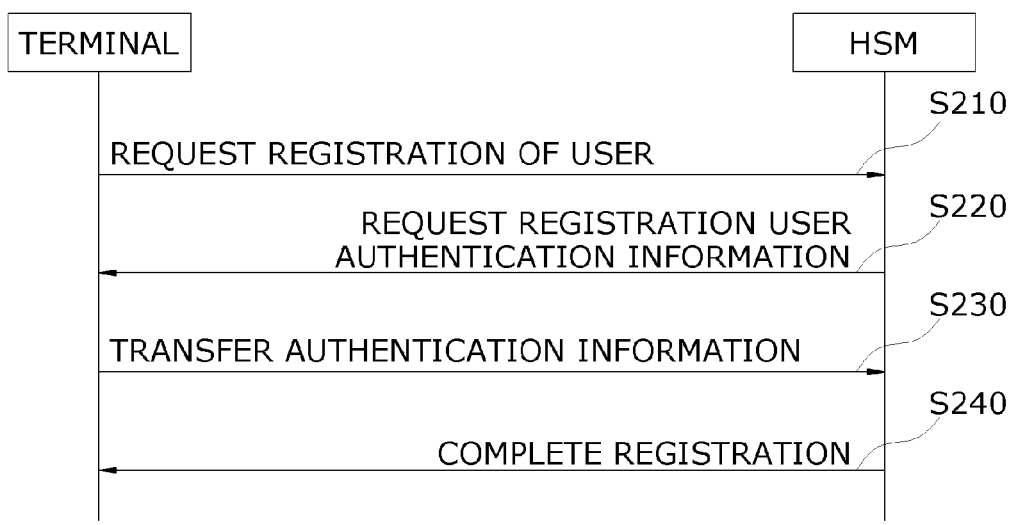
FIG. 2 is a flowchart illustrating an operation of registering a user of a mobile terminal in an HSM, according to an embodiment of the present invention.

FIG. 2 is a flowchart illustrating an operation of registering a user of a mobile terminal in an HSM, according to an embodiment of the present invention.

Referring to FIG. 2, it is assumed that a user purchases a mobile terminal and performs a registration operation by using an arbitrary administration application installed in the mobile terminal. Therefore, an element that performs the following operations is assumed as an administration application. The administration application may be substantially executed by the first processor 230 illustrated in FIG. 1, and thus, the element that performs the following operations may be construed as the first processor 230.

First, in step S210, an administration application of a mobile terminal may transfer a user registration request message, which requests registration of a user, to an HSM.

Subsequently, in step S220, the HSM may transfer an authentication information request message, which requests user authentication information for registering the user of the mobile terminal, to the administration application of the mobile terminal in response to the user registration request message. In this case, the HSM may check whether a key pair including a unique public key and private key of the mobile terminal is stored in an internal memory of the HSM, and when the unique public key and private key of the mobile terminal are not stored in the internal memory, the HSM may generate a key pair including a public key and a private key of the mobile terminal, add the public key of the key pair of the mobile terminal into the authentication information request message, and transfer the authentication information request message including the public key to the administration application of the mobile terminal.

Subsequently, in step S230, the administration application of the mobile terminal may generate user authentication information for registering the user of the mobile terminal and may transfer the user authentication information to the HSM in response to the authentication information request message. In this case, the administration application of the mobile terminal may encrypt the user authentication information by using the public key of the mobile terminal included in the authentication information request message and may transfer the encrypted user authentication information to the HSM.

Here, the user authentication information for registering the user of the mobile terminal in the HSM may be information for notifying whether the user of the mobile terminal has a right authority to access the HSM. Since signification data is stored in the HSM, it is required for the HSM to check whether the user of the mobile terminal has a right authority to access the HSM.

A user authentication number may be, for example, a personal identification number (PIN) or the like. When the user authentication number is a PIN, the PIN may be coupled to other information, and the PIN coupled to the other information may be stored in an internal storage unit of the HSM in a form expressed as a hash function.

Subsequently, in step S240, the HSM may decrypt the encrypted user authentication information transferred from the administration application of the mobile terminal by using the private key of the mobile terminal, store the decrypted user authentication information in the internal storage unit, and end the registration of the user. Depending on the case, the user authentication information may be stored in an encrypted state without being decrypted. In this case, when the registration of the user is completed, the HSM may transfer a registration completion message indicating completion of user registration to the administration application of the mobile terminal, thereby ending a series of procedures of registering the user in the HSM.

When the administration application of the mobile terminal completes the registration of the user, an operation of registering a terminal and a user, which transfer terminal registration information and user registration information stored in the HSM to the server 100, in the server 100 may be performed.

Figure 3:
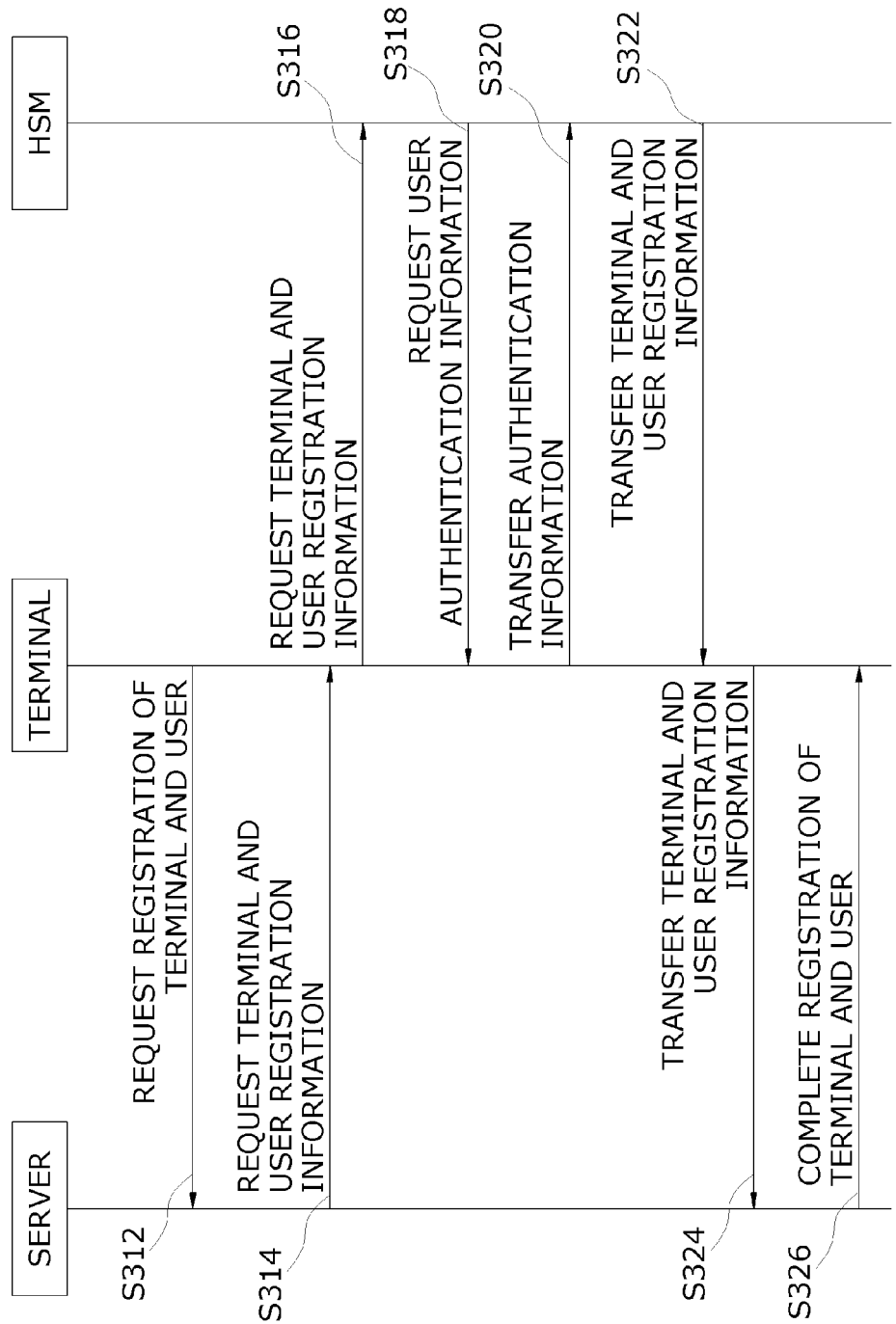
FIG. 3 is a flowchart illustrating an operation of registering a mobile terminal and a user in a server, according to an embodiment of the present invention.

FIG. 3 is a flowchart illustrating an operation of registering a mobile terminal and a user in a server, according to an embodiment of the present invention.

Referring to FIG. 3, an administration application of a mobile terminal may transfer a registration request message, which requests registration of a server and a user, to the server in step S312.

Subsequently, in step S314, the server may transfer a registration information request message, which requests registration information of each of the mobile terminal and the user, to the mobile terminal in response to the registration request message. In this case, the registration information message may include a signature value of the server which is generated by using a private key of the server.

Subsequently, in step S316, the administration application of the mobile terminal may transfer the registration information request message, transferred from the server, to an HSM to request the registration information of each of the mobile terminal and the user from the HSM.

Subsequently, the HSM may check the signature value of the server included in the registration information request message transferred from the administration application of the mobile terminal by using a pre-stored public key of the server, and when the signature value is checked, the HSM may transfer an authentication information request message, which requests user authentication information for authenticating the user, to the administration application of the mobile terminal in step S318. In this case, a public key of the mobile terminal generated by the HSM may be added into the authentication information request message and may be transferred to the administration application of the mobile terminal.

Subsequently, in step S320, the administration application of the mobile terminal may transfer user authentication information, generated in the user registration operation of FIG. 2, to the HSM. In this case, the user authentication information may be encrypted by using the public key of the mobile terminal which is transferred in step S318, and the encrypted user authentication information may be transferred to the HSM. In this case, the HSM may decrypt the encrypted user authentication information transferred from the administration application of the mobile terminal by using the private key of the mobile terminal and may compare the decrypted user authentication information with the user authentication information which is stored in the registration operation of FIG. 2, thereby performing a user authentication operation.

Subsequently, when the user is successfully authenticated, the HSM may transfer registration information, which is necessary for registering each of the mobile terminal and the user, to the administration application of the mobile terminal in step S322. In this case, terminal registration information and user registration information may be encrypted by using the public key of the server and may be transferred to the administration application of the mobile terminal, and a signature value of the mobile terminal generated from the private key of the mobile terminal may be transferred to the administration application of the mobile terminal along with the encrypted terminal registration information and user registration information.

The terminal registration information and the user registration information transferred to the administration application of the mobile terminal may each be registration information which is previously stored in an internal storage unit of the HSM. Here, the terminal registration information may be registration information for registering the mobile terminal in the server and may include a serial number, a manufactured date, a public key, and/or the like of the mobile terminal. The user registration information may be registration information for registering the user of the mobile terminal in the server and may include a name, birth date, and sex of the user of the mobile terminal and other significant information necessary for registration of a user.

Subsequently, in step S324, the mobile terminal may transfer, to the server through a wired/wireless communication network (150 of FIG. 1), the terminal registration information and the user registration information which are encrypted by using the public key of the server and are transferred from the HSM and a signature value of the mobile terminal which is generated by using the private key of the mobile terminal.

The server may decrypt the terminal registration information and the user registration information transferred through the wired/wireless communication network (150 of FIG. 1) by using the private key of the server and may check the signature value of the mobile terminal by using the public key included in the terminal registration information. When the signature value is checked, the server may store the terminal registration information and the user registration information in a storage unit of the server to register the mobile terminal and the user in the server in step S326. Simultaneously, the server may a registration completion message indicating completion of terminal and user registration to the mobile terminal, and thus, a series of procedures of registering the mobile terminal and the user in the server may end.

Hereinafter, an operation of updating an ICV stored in an HSM and programs installed in a mobile terminal will be described in detail with reference to FIG. 4.

FIG. 4 is a flowchart illustrating an operation of updating an ICV stored in an HSM and programs installed in a mobile terminal, according to an embodiment of the present invention.

Referring to FIG. 4, in step S412, a server may transfer an update notification message, indicating that there is an update file for a program installed in the mobile terminal, to the mobile terminal.

Subsequently, an administration application of the mobile terminal may check whether to update the installed program, in response to the update notification message, and when an update is needed, the mobile terminal may transfer, to the server, a program update request message which requests the update file for updating the program in step S414. Here, the program to be updated may be firmware, an OS version, an arbitrary mobile application, or the like.

Subsequently, in response to the program update request message, the server may transfer the update file for the program, which is to be updated, to an administration application of the mobile terminal in step S416. In this case, the server may transfer, to the administration application of the mobile terminal, an ICV for the update file and a signature value of the server along with the update file. Here, the server may encrypt the ICV for the update file by using a public key of the mobile terminal, transfer the encrypted ICV to the administration application of the mobile terminal, generate the signature value of the server by using a private key of the server, and transfer the generated signature value of the server to the administration application of the mobile terminal.

Subsequently, in step S418, the administration application of the mobile terminal may transfer an ICV update request message, which requests updating of a previous ICV stored in an HSM, to the HSM in response to the program update request message transferred from the server. In this case, the administration application of the mobile terminal may transfer, to the HSM, the ICV for the update file transferred from the server and the signature value of the server generated from the private key of the server.

Subsequently, in step S420, the HSM may check the signature value of the server transferred from the administration application of the mobile terminal by using the public key of the server.

Subsequently, in step S422, when the check succeeds, the HSM may transfer an authentication information request message, which requests user authentication information, to the administration application of the mobile terminal, for determining whether an update request for a previously stored ICV is issued by a user having an update authority on an ICV. In this case, the HSM may transfer a public key of the mobile terminal to the administration application of the mobile terminal along with the authentication information request message.

Subsequently, in response to the authentication information request message, the administration application of the mobile terminal may encrypt the user authentication information by using the public key of the mobile terminal which is transferred in step S422, and may transfer the encrypted user authentication information to the HSM in step S424.

Subsequently, the HSM may decrypt the encrypted user authentication information by using the private key of the mobile terminal and may compare the decrypted user authentication information with the user authentication information which is stored in the registration operation of FIG. 2, thereby performing a user authentication operation. When the user is successfully authenticated, the HSM may decrypt the ICV, which is encrypted by using the public key of the mobile terminal, by using the private key of the mobile terminal and may update the previously stored ICV to the decrypted ICV in step S426.

Subsequently, when a previous ICV is completely updated to the ICV for the update file, the HSM may transfer an update completion message, indicating that updating of the ICV is completed, to the mobile terminal in step S428. In this case, the HSM may transfer a signature value of the mobile terminal, which is generated by using the private key of the mobile terminal, to the mobile terminal along with the update completion message.

Subsequently, in step S430, the mobile terminal may update a corresponding program by using the update file, which is transferred in step S416, in response to the update completion message.

Subsequently, in step S432, when updating of the corresponding program is completed, the mobile terminal may transfer an update completion message, indicating that updating of the corresponding program is completed, to the server along with the signature value of the mobile terminal which is transferred in step S428, and thus, a series of procedures of updating the ICV stored in the HSM and the program installed in the mobile terminal may end.

According to the embodiments of the present invention, since a significant program stored in a mobile terminal or an ICV stored in an HSM built into the mobile terminal is updated after a user is authenticated and an access authority on the mobile terminal is checked, an operation of updating the significant program or the ICV can be stably protected from external factors.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of updating an integrity check value (ICV) stored in a hardware security module (HSM) which is built into a terminal, includes a dedicated hardware resource independent from a hardware resource included in the terminal, and performs a security operation associated with checking of integrity of significant data installed in the terminal based on the dedicated hardware resource, the method comprising:
   storing user authentication information of the terminal transferred from the terminal to preregister a user of the terminal;
   transferring an authentication information request message, requesting the user authentication information, to the terminal in response to an update request message which is transferred from the terminal and includes an update value of the ICV;
   comparing the user authentication information transferred from the terminal with the stored user authentication information to perform an authentication operation on the user of the terminal according to the authentication information request message; and
   when the user of the terminal is successfully authenticated, updating the stored ICV by using the update value.

2. The method of claim 1, wherein the preregistering of the user comprises:
   receiving a registration request message, requesting registration of the user, from the terminal;
   transferring a registration authentication information request message, requesting the user authentication information, to the terminal in response to the registration request message;
   receiving the user authentication information, encrypted for the registration authentication information request message, from the terminal;
   decrypting the encrypted user authentication information to store the decrypted user authentication information in an internal memory; and
   when storing of the user authentication information is completed, transferring a registration completion message, notifying completion of the preregistration of the user of the terminal, to the terminal.

3. The method of claim 2, wherein the transferring of the registration authentication information request message comprises:
   generating a key pair including a public key and a private key of the terminal; and
   transferring the registration authentication information request message including the public key of the terminal to the terminal.

4. The method of claim 3, wherein the receiving of the encrypted user authentication information comprises receiving the user authentication information which has been encrypted by using the public key of the terminal.

5. The method of claim 4, wherein the storing of the decrypted user authentication information comprises:
   decrypting, by using the private key of the terminal, the user authentication information of the terminal which has been encrypted by using the public key of the terminal; and
   storing the user authentication information of the terminal, which has been decrypted by using the private key of the terminal, in the internal memory.

6. The method of claim 3, wherein the transferring of the registration authentication information request message comprises transferring the registration authentication information request message including the public key of the terminal to the terminal.

7. The method of claim 6, wherein the performing of the authentication operation comprises:
   receiving the user authentication information of the user, which has been encrypted by using the public key of the terminal, from the terminal;
   decrypting the encrypted user authentication information of the terminal received from the terminal by using the private key of the terminal; and
   comparing the decrypted user authentication information of the terminal with the stored user authentication information of the terminal to perform the authentication operation on the user of the terminal.

8. A method of updating a program stored in a terminal by using a hardware security module (HSM) which is built into the terminal, includes a dedicated hardware resource independent from a hardware resource included in the terminal, and performs a security operation associated with checking of integrity of significant data installed in the terminal based on the dedicated hardware resource, the method comprising:
   receiving, by the terminal, an update file for updating the program, an update value for updating an integrity check value (ICV) of the program, and a signature value of the server from the server, and transferring an update request message including the received update value and signature value to the HSM;
   transferring, by the HSM, an authentication information request message requesting user authentication information of the terminal to the terminal in response to the update request message;
   transferring, by the terminal, the user authentication information of the terminal to the HSM in response to the authentication information request message;
   comparing, by the HSM, the user authentication information with preregistered user authentication information to perform an authentication operation on the user of the terminal, and when the user of the terminal is successfully authenticated, updating a pre-stored ICV by using the update value;
   when updating of the ICV is completed, by the HSM, transferring an update completion message to the terminal; and
   updating, by the terminal, the program by using the update file in response to the update completion message.

9. The method of claim 8, further comprising:
   before the transferring of the update request message to the HSM,
   generating, by the server, a key pair including a public key and a private key of the server;
   generating, by the HSM, a key pair including a public key and a private key of the terminal;
   pre-storing, by the server, the public key of the terminal generated by the HSM; and
   pre-storing, by the HSM, the public key of the server generated by the server.

10. The method of claim 9, further comprising:
    before the transferring of the update request message to the HSM,
    receiving, by the terminal, an update notification message, indicating a need to update a program stored in the terminal, from the server;

transferring, by the terminal, a program update request message requesting updating of the program to the server in response to the update notification message;

encrypting, by the server, an update value of the ICV by using the public key of the terminal in response to the program update request message, and generating the signature value by using the private key of the server; and transferring, by the server, the encrypted update value of the ICV and the signature value generated based on the private key of the server to the terminal.

11. The method of claim 10, wherein the transferring of the authentication information request message comprises:

checking the signature value included in the update request message by using the public key of the server; and when the check succeeds, transferring an authentication information request message requesting user authentication information of the terminal to the terminal.

12. The method of claim 10, wherein the transferring of the authentication information request message comprises transferring, by the HSM, the authentication information request message including the public key of the terminal to the terminal.

13. The method of claim 12, wherein the transferring of the user authentication information comprises:

encrypting, by the terminal, the user authentication information of the terminal by using the public key of the terminal; and transferring the encrypted user authentication information of the terminal to the HSM.

14. The method of claim 13, wherein the updating of the pre-stored ICV comprises:

decrypting the encrypted user authentication information of the terminal by using the private key of the terminal;

comparing the decrypted user authentication information of the terminal with pre-stored user authentication information of the terminal to authenticate the user of the terminal;

when the authentication of the terminal is completed, by using the private key of the terminal, decrypting the update value of the ICV encrypted based on the public key of the terminal; and updating the pre-stored ICV by using the update value decrypted based on the private key of the terminal.

15. The method of claim 9, wherein the transferring of the update completion message comprises:

generating a signature value of the terminal generated based on the private key of the terminal; and transferring the update completion message including the signature value of the terminal to the terminal.

16. The method of claim 9, further comprising:

before the transferring of the update value and the update request message including the signature value to the HSM, encrypting terminal registration information that includes a serial number and a manufactured date of the terminal pre-stored in the HSM and the public key of the terminal, based on the public key of the server; and transferring the terminal registration information encrypted based on the public key of the server to the server through the terminal to register the terminal registration information in the server.

17. A hardware security module (HSM) which is built into a terminal, includes a dedicated hardware resource independent from a hardware resource included in the terminal, and performs a security operation associated with checking of integrity of significant data installed in the terminal based on the dedicated hardware resource, the HSM comprising:

a key generator configured to generate a key pair including a public key and a private key of the terminal;

a storage unit configured to store user authentication information of the terminal and an integrity check value (ICV) for checking the integrity of the significant data installed in the terminal; and a second processor configured to receive an update value of the ICV, encrypted based on the public key of the terminal, from a first processor included in the terminal and update the ICV stored in the storage unit by using the received update value, the second processor being driven independent from the a first processor, wherein the second processor receives the user authentication information of the terminal encrypted based on the public key of the terminal from the first processor, decrypts the received user authentication information of the terminal by using the private key of the terminal, and compares the decrypted user authentication information of the terminal with the user authentication information of the terminal stored in the storage unit, and when authentication of the user is completed, the second processor decrypts the encrypted update value of the ICV by using the private key of the terminal and updates the ICV stored in the storage unit by using the decrypted update value.

* * * * *